2,897,052
Patented July 28, 1959

2,897,052
METHOD FOR PREPARING STABLE POTASSIUM NITROSO DISULFONATE

Hans Joachim Teuber, Frankfurt am Main, Germany

No Drawing. Original application June 20, 1952, Serial No. 294,713, now Patent No. 2,782,210, dated February 19, 1957. Divided and this application November 19, 1956, Serial No. 622,821

Claims priority, application Germany July 24, 1951

2 Claims. (Cl. 23—101)

The present invention relates to a stable potassium nitroso disulfonate and to a process of preparing such stable salt.

The present application is a division of my co-pending application Serial No. 294,713, filed June 20, 1952, now Patent No. 2,782,210, and entitled "New Oxidation Products of Organic Compounds, and a Method of Making Same."

Heretofore, the potassium metal salt of nitroso disulfonic acid was obtained in a form which readily decomposed and could be stored at most for about 24 hours. It was prepared by reacting alkali metal nitrite with alkali metal hydrogen sulfite followed by dehoydrogenation by means of lead dioxide or potassium permanganate. The yield is rather small and does not exceed about 30% of the theoretical yield.

It is one object of the present invention to provide a simple and improved process of preparing the potassium metal salt of nitroso disulfonic acid in a stable form permitting storage, in the dry state, for an unlimited period of time whereby the yield is surprisingly high and far exceeds the yield obtained by proceeding according to the known process.

Another object of the present invention is to provide such a stable potassium nitroso disulfonate.

Other objects of the present invention and advantageous features thereof will become apparent as the description proceeds.

In principle, the process according to the present invention consists in reacting sodium nitrite and 10 N sodium hydrogen sulfite and subsequently dehydrogenating the resulting sodium metal salt of hydroxylamine disulfonic acid with potassium permanganate in the presence of ammonia. It is an essential feature of the present process that the reactants employed in this reaction are of the purest available quality, that an excess of ammonia is used, and that the reaction mixture is strongly cooled. Furthermore, any traces of heavy metal and alkaline earth metal ions, especially of manganese dioxide formed during dehydrogenation, must be removed from the reaction solution containing the potassium nitroso disulfonate and the isolated salt must be washed with suitable water miscible organic solvents which are free of any reducing or acidic impurties.

Preferably the manganese dioxide sludge is allowed to settle before filtration. It is also advisable to repeatedly pass the filtrate through the filter the pores of which are filled with manganese dioxide until it is completely free of manganese. The potassium metal salt of nitroso disulfonic acid is precipitated from the resulting solution of its sodium metal salt by the addition of the same volume or of one and a half times its volume of a pure potassium chloride solution saturated at 30° C. The mixture is then strongly cooled, preferably in ice. After filtration, the potassium salt is recrystallized from potassium hydroxide solution. The recrystallized and filtered salt is washed with a water miscible alcohol to remove adhering alkali metal hydroxide. Preferably pure methanol is used for washing the resulting potassium metal salt. Ethanol, propanol, or acetone may also be employed for this purpose. These solvents must be free of reducing impurities, such as aldehydes.

The potassium metal salt of nitroso disulfonic acid is dried in a vacuum at a low temperature and can be stored at room temperature in evacuated ampoules or in a vacuum desiccator for a practically unlimited period of time.

The resulting potassium nitroso disulfonate is of neutral reaction. Its solution in water remains clear on addition of barium hydroxide solution while barium chloride solution causes precipitation. Decomposed preparations are of acid reaction and barium sulfate is precipitated therefrom by the addition of barium hydroxide solution. The salt is soluble in about 50 parts of water and, at 50° C., in about 20 parts of N potassium hydroxide solution. Iodine is precipitated from neutral or, more completely, from acidified iodide solution in an amount approximately corresponding to an oxidation equivalent.

Potassium nitroso disulfonate is an excellent dehydrogenating and oxidizing agent for the dehydrogenation and oxidation of organic compounds and especially of aromatic hydroxy compounds, i.e. of phenols and their substitution products as described and claimed in my copending application Serial No. 294,713, now Patent No. 2,782,210.

The following example serves to illustrate the present invention without, however, limting the same thereto.

Example 35 cc. of 18% chemically pure ammonia solution are added to an aqueous solution of sodium hydroxylamine disulfonate obtained by reacting 33 g. of chemically pure sodium nitrite dissolved in 200 cc. of water with 90 cc. of an aqueous 10 N chemically pure sodium hydrogen sulfite solution with the addition of 19 cc. of chemically pure glacial acetic acid. 380 cc. of chemically pure aqueous potassium permanganate solution are added, portion by portion, to the resulting mixture while stirring and cooling. Care is taken that, during addition of the permanganate the temperature of the solution is maintained between 0° C. and 5° C. After allowing the reaction mixture to stand for about 1 hour in the cold, the manganese dioxide precipitate is carefully filtered and filtration is repeated until the filtrate is free of manganese.

An equal volume of an aqueous pure potassium chloride solution, saturated at 30° C., is added thereto and the mixture is cooled by means of ice. The precipitated and crystallized potassium metal salt of nitroso disulfonic acid is filtered off by suction, washed by covering with ice water, and recrystallized by dissolving in N potassium hydroxide solution at 50° C. and cooling said solution, after filtration, to about 5° C. The resulting crystalline precipitate is rapidly filtered off by suction and carefully washed with cold methanol which must be free of any reducing impurities, until the wash methanol does not show alkaline reaction. The pure crystalline salt is dried in a vacuum, preferably at a low temperature, for instance, at 5° C. It is stored under exclusion of air, moisture, and acid vapors in the cold, preferably in sealed ampoules which are evacuated or filled with an inert gas such as nitrogen. Yield, calculated for sodium hydrogen sulfite used: About 78% of the theoretical yield.

Spectrometric analysis of the potassium nitroso disulfonate obtained according to the present invention shows that the manganese content is between 0.0003% and 0.003% and that amounts of other heavy metals such as iron, copper, lead, and nickel, of alkaline earth metals such as calcium, barium, and magnesium, of aluminum, titanium, and silicon are also very low. Lead and barium cannot be determined with certainty because the values found are near the limit of determinability by spectrometric methods.

A typical spectrum analysis of a salt obtained according to the present invention showed the following traces of impurities:

|    | Percent |
|----|---------|
| Fe | 0.003 to 0.03 |
| Al | 0.001 to 0.01 |
| Si | 0.001 to 0.01 |
| Ca | Less than 0.01 |
| Pb | 0.0001 to 0.001 |
| Ba | Less than 0.001 |
| Mn | 0.0003 to 0.003 |
| Mg | 0.0003 to 0.003 |
| Cu | 0.0003 to 0.003 |

Traces of Na, Ni, and Ti.

A salt which is suitable for prolonged storage has the property that its aqueous solution retains, for at least 1½ hours, its violet color and does not become of acid reaction.

The solid salt has a yellow-orange color and is dimeric while in solution it is monomeric and the solution has a permanganate-like violet color.

In place of potassium chloride, there can be used potassium nitrate, potassium sulfate, or potassium carbonate for salting out the salt from its solution.

In order to eliminate any traces of acid which might have been formed or might be present in the laboratory atmosphere when preparing, drying, and storing the salt, it is advisable to admix small amounts of a basic gas, such as trimethylamine, to the inert gas atmosphere or the vacuum in which the salt is stored. Such a basic gas combines with and neutralizes the traces of acid and, thus, prevents any continuing decomposition of the salt which is catalytically accelerated by traces of acid.

The preparation of potassium nitrosodisulfonate must not be carried out in vessels made of steel or having a metallic surface.

I claim:

1. In a process of preparing the substantially pure and stable potassium metal salt of nitroso disulfonic acid, the steps comprising adding acetic acid to an aqueous solution of substantially pure sodium nitrite and sodium hydrogen sulfite, said sodium nitrite and sodium hydrogen sulfite being reacted in the molar proportion of 1 mol to about 2 mols, admixing to the resulting solution of the sodium metal salt of hydroxylamine disulfonic acid an excess of substantially pure ammonia, adding portion by portion to the resulting solution following its preparation an aqueous solution of substantially pure potassium permanganate, thereby maintaining the temperature of the reaction mixture between about 0° C. and about 5° C., substantially completely removing the precipitated manganese dioxide from the reaction solution by repeated filtration, adding an aqueous solution of an excess of a substantially pure, water soluble potassium metal salt, said solution being substantially saturated at 30° C., to the filtrate, cooling the reaction mixture by means of ice, rapidly filtering off the precipitated potassium metal salt of nitroso disulfonic acid, recrystallizing said salt from substantially pure potassium hydroxide solution, washing the recrystallized salt with a substantially pure water miscible organic solvent free from reducing impurities to remove adhering potassium hydroxide therefrom, drying the salt, and storing the dried salt thereby excluding air, moisture, and acids.

2. The process of preparing the substantially pure and stable potassium metal salt of nitroso disulfonic acid according to claim 1, wherein the water soluble potassium metal salt added to the filtrate to precipitate the potassium metal salt of nitroso disulfonic acid, is potassium chloride and the water miscible organic solvent used for washing the crystallized potassium metal salt of nitroso disulfonic acid, is methanol.

References Cited in the file of this patent

UNITED STATES PATENTS 1,010,177     Raschig                Nov. 28, 1911

OTHER REFERENCES

Mellor: "Comprehensive Treatise on Inorganic Chemistry," Longmans, Green and Co., New York, 1923, vol. 8, pp. 672–6.